Patented Dec. 23, 1924.

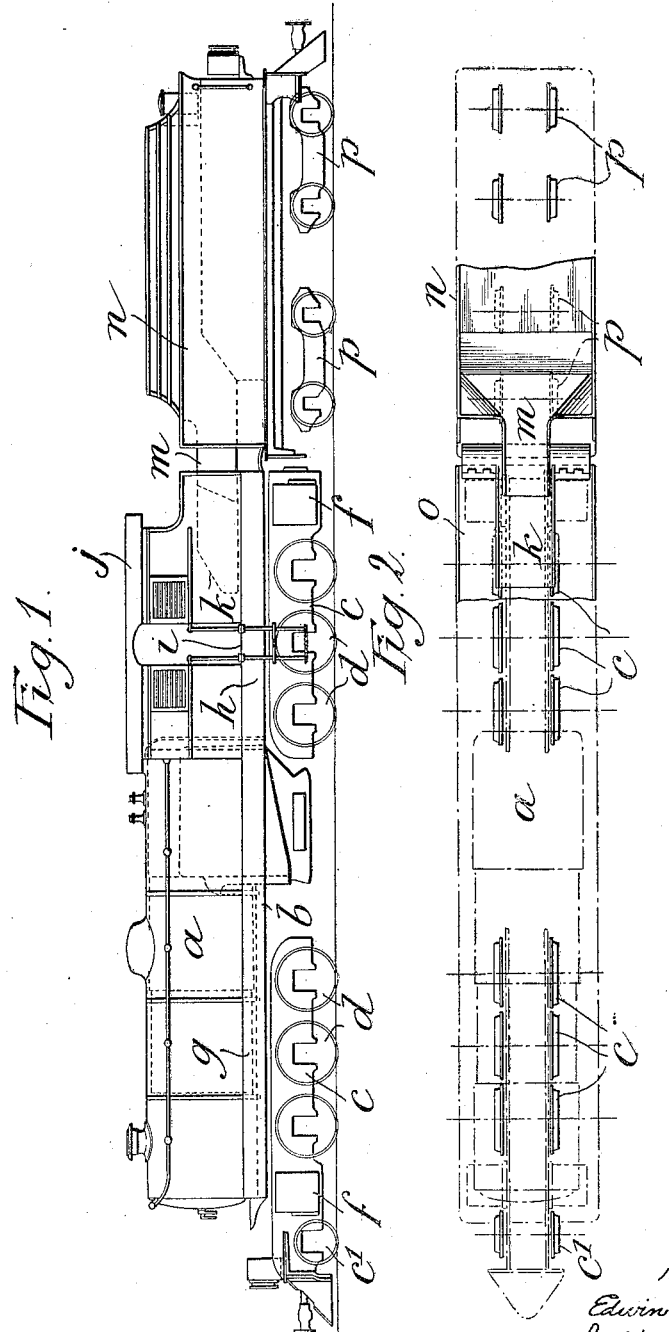

1,520,331

UNITED STATES PATENT OFFICE.

EDWIN KITSON CLARK, OF LEEDS, ENGLAND.

ARTICULATED LOCOMOTIVE.

Application filed November 16, 1922. Serial No. 601,413.

*To all whom it may concern:*

Be it known that I, EDWIN KITSON CLARK, a subject of the King of Great Britain and Ireland, residing at Leeds, in the county of York, England, have invented Improvements in or Relating to Articulated Locomotives, of which the following is a specification.

The object of the present invention is to provide an improved locomotive of the articulated type.

Locomotives of the articulated type have heretofore been constructed wherein the engine, cab and tender are carried by a single frame pivotally mounted upon separate engine driven bogies. With such a construction, the adhesion between the carrying wheels of the bogies and the rail of the track is not constant but varies with reduction in the weight as the fuel and water supply are withdrawn from the tender and used. This in many cases constitutes a practical disadvantage. Locomotives of the articulated type are also known in which the fuel and water are carried by the bogies and in this case also the withdrawal of fuel and water for the service of the engine affects the weight on the driving wheels of the bogies. In another construction of locomotive engine, of the articulated type, the boiler with its cab is mounted upon an engine framing the forward portion only of which is pivoted to a leading engine driven bogie, the rear portion of the framing being carried by wheels and axles that are non-rotatable or fixed in relation to the framing, the fuel and water supplies being carried by a separate tender coupled to the engine. With this arrangement however although constant adhesion can be obtained between the carrying wheels of the locomotive and the track rails, objectionable strains are introduced at the leading end of the engine when running over curved portions of track rails.

Now the present invention has for its object to provide a locomotive engine of the articulated type suitable for use on track rails where the curves are such that complete articulation is necessary, and adapted to avoid the introduction of objectionable strains in the engine framing or superstructure, and where it is important that a practically constant degree of adhesion between the carrying wheels of the locomotive and track rails shall at all times obtain.

For this purpose in a locomotive engine of the articulated type according to the present invention, the boiler and cab portions of the engine are mounted upon a frame or superstructure pivotally connected to and carried by two engine driven bogie arrangements, and the fuel and water for use in such locomotive are carried by a tender superstructure separately mounted upon ordinary carrying wheels and axles, or upon non-engine driven bogie arrangements and hauled by the articulated engine. In this way there is obtained a locomotive which is completely articulated and unaffected by variation in the tender load so that the adhesion between the locomotive and the rails is constant. Such an arrangement however of articulated engine, involves lateral movement of the foot plate end in the cab of the locomotive relative to the fuel shovelling platform of the tender, much exceeding that when the rear driving portion of the engine is fixed axially with reference to the engine framing or superstructure, so that the supply of fuel to the engine boiler could not, under ordinary circumstances, be effected in already and conventional manner. To avoid this disadvantage, the foot plate in the cab of the engine is provided with a stationary fuel receiver arranged at a convenient distance from the fire hole of the boiler furnace and the tender is provided with a chute which is adapted to admit of the fuel being readily fed from the tender to the fuel receptacle and which does not rest upon the receiver so that it will not impose any vertical load on the locomotive. The fuel receiver and chute are also so relatively constructed and arranged as to allow of free relative turning movement between the engine and tender when travelling around curved portions of track rails.

Fig. 1 of the accompanying drawings illustrates the general arrangement of the parts of the improved locomotive and tender, Fig. 2 being a plan of a portion of the same.

As here shown, the locomotive comprises a boiler portion *a* the framing *b* whereof is carried by the pivots of two engine driven bogies *c*, each comprising any required number of driving wheels *d* with or without pony, radial or truck wheels *c'* and equipped with the requisite cylinders *f* and connections, the pivots being conveniently positioned, as at *g* and *h*, for the weight of the locomotive at the front and rear of the framing *b* of the boiler portion *a*. The floor *i* of the engine cab *j* which is at the rear of the boiler and over the rear engine-driven bogie *c*, is provided with a coal receiver *k* into which extends the delivery end of a chute *m* projecting forwardly from the tender *n* which is articulated to the framing *b* of the boiler portion *a* of the locomotive. The width of the coal receiver *k* and chute *m* is such that a gangway *o* is provided on each side thereof to enable the fireman to readily get to the back of the tender *n* and replenish the coal receiver which carries the immediate supply. The coal chute *m* does not rest upon the coal receiver *k* and the engine therefore only experiences a variation in load within the limits of the capacity of the receiver which is relatively small. Coaling from a stationary coal receiver is easier to perform than when obtaining the fuel directly from a tender vertically movable in relation to the cab.

The tender *n* for such engine, comprising a water tank and bunker, may be carried by ordinary wheels and axles, or, as shown, by bogies *p* of usual type.

In the example of locomotive and tender shown, the front end of the engine superstructure *b* is carried by a pivoted bogie *c* having six coupled wheels and a leading pony truck *c'* and the hind end of the superstructure is borne by a pivoted bogie *c* having six coupled wheels. The tender superstructure is carried by two four wheeled bogies *p* of usual type.

What I claim is:—

1. A constant adhesion articulated locomotive comprising a boiler and a cab, a framing whereon the boiler and cab are mounted, two engine driven bogies pivoted to the forward and rearward portions of the framing and a fuel receiver on the foot plate of the cab.

2. A constant adhesion articulated locomotive comprising a boiler and a cab, a framing whereon the boiler and cab are mounted, two engine driven bogies pivoted to the forward and rearward portions of the framing, a fuel receiver on the foot plate of the cab, a tender coupled to said framing and means carried by said tender and extending over but independent of said fuel receiver and whereby fuel can be transferred from said tender and delivered into said fuel receiver, substantially as described for the purpose set forth.

3. A constant adhesion articulated locomotive comprising a boiler and a cab, a framing whereon the boiler and cab are mounted, two engine driven bogies pivoted to the forward and rearward portions of the framing, a fuel receiver mounted on the foot plate of the cab, a tender coupled to said locomotive, and a fuel chute carried by said tender and extending over and into said fuel receiver without resting upon said receiver and whereby fuel can be transferred from the tender to the fuel receptacle, substantially as described for the purpose set forth.

4. In a locomotive, the combination with a boiler portion and cab and a tender, of a coal receiver stationarily mounted in the cab so that one end is at a firing distance from the boiler portion, and a coal chute narrower in width than the coal receiver and extending from the tender so as to discharge upon the receiver without resting thereon, substantially as described.

5. In a locomotive, the combination with a boiler portion and cab and a tender, of a coal receiver stationarily mounted in the cab and of a width such as to provide a gangway at each side thereof, and a coal chute in the tender, also of a width such as to provide a gangway at each side thereof, the delivery end of the said chute being narrower than the coal receiver and adapted to loosely enter the latter, without resting thereon.

Signed at Leeds, England, this 31st day of October, 1922.

EDWIN KITSON CLARK.